United States Patent [19]
Hester

[11] Patent Number: 5,352,305
[45] Date of Patent: Oct. 4, 1994

[54] PRESTRESSED BRAKE DRUM OR ROTOR

[75] Inventor: Larry B. Hester, Dayton, Ohio

[73] Assignee: Dayton Walther Corporation, Dayton, Ohio

[21] Appl. No.: 778,438

[22] Filed: Oct. 16, 1991

[51] Int. Cl.⁵ .............................................. B21D 53/34
[52] U.S. Cl. .................... 148/581; 148/583; 148/612; 72/53
[58] Field of Search ................. 148/581, 583, 612; 72/53; 29/411, 458

[56] References Cited

U.S. PATENT DOCUMENTS

| | | | |
|---|---|---|---|
| 3,630,323 | 12/1971 | Hickle | 29/458 |
| 3,670,392 | 6/1972 | Haas | 29/417 |
| 4,175,070 | 11/1979 | Klein et al. | 106/36 |
| 4,241,597 | 12/1980 | Golata et al. | 72/327 |
| 4,262,407 | 4/1981 | Peterson et al. | 29/460 |
| 4,948,437 | 8/1990 | Metzler | 148/612 |
| 4,961,791 | 10/1990 | Metzler et al. | 148/612 |
| 5,193,375 | 3/1993 | Meister | 72/53 |

OTHER PUBLICATIONS

Shot Peening Applications, 7th Ed., Booklet published by the Metal Improvement Co., Inc. of Paramus, N.J.

Primary Examiner—George Wyszomierski
Attorney, Agent, or Firm—MacMillan, Sobanski & Todd

[57] ABSTRACT

Uniformly distributed compressive stresses are induced in the machined surfaces of brake drums and brake rotors. The compressive stresses cancel residual tensile stresses induced in the surfaces by machining operations during fabrication. Cancellation of the surface tensile stresses delays formation of cracks during brake service use and extends the service life of the brake drum or rotor. Shot peening is an applicable prestressing process which also imparts a surface roughness that reduces the time required to burnish bake pads to match the shape of the drum or rotor surface. The reduction of burnishing time reduces the amount of surface cracking caused by surface heating by brake pad high spots as the high spots are ground down.

7 Claims, 2 Drawing Sheets

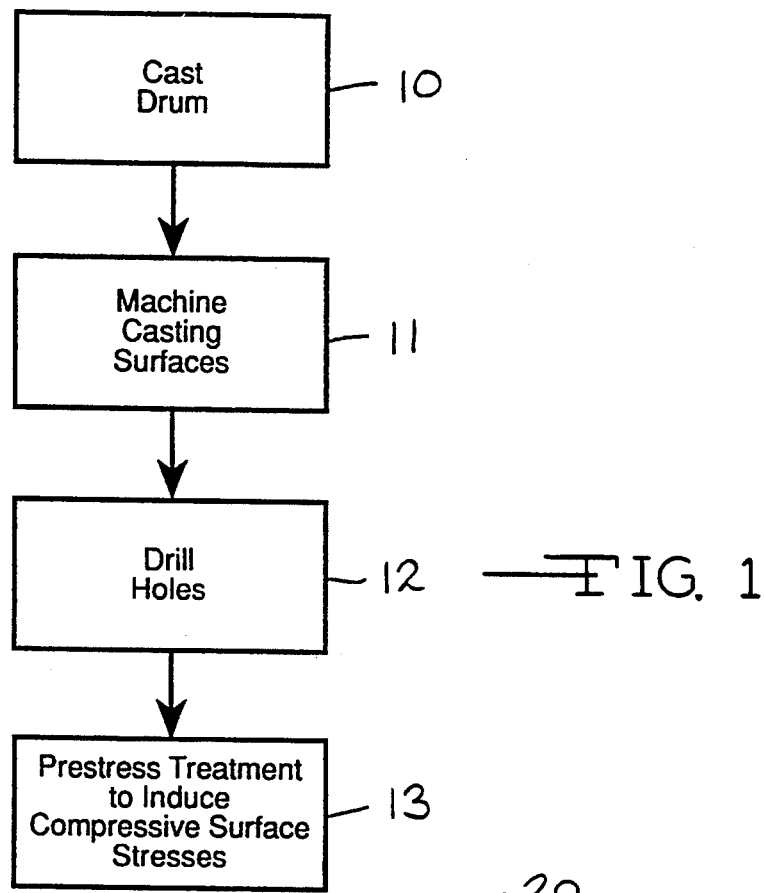
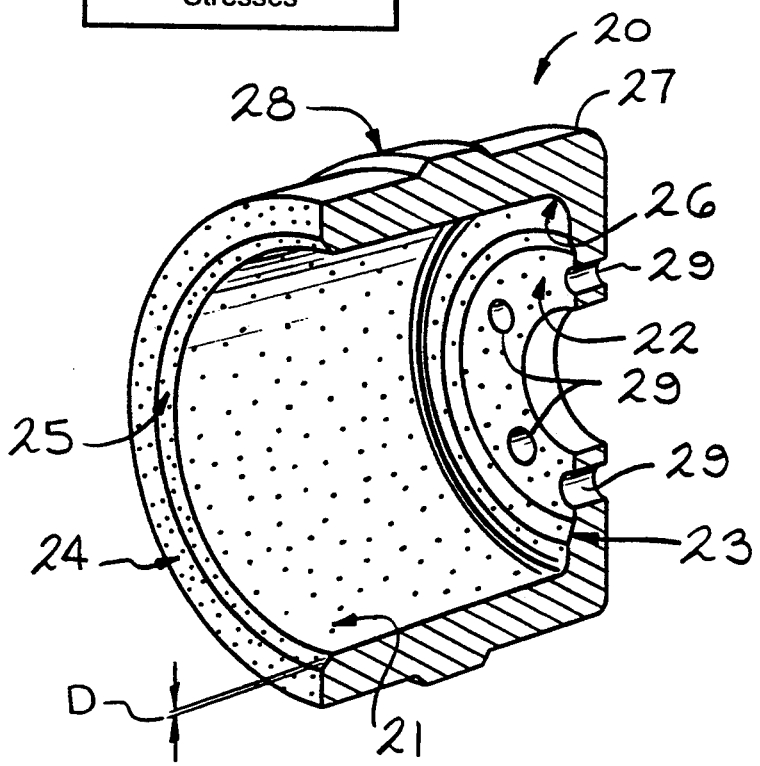

PRESTRESSED BRAKE DRUM OR ROTOR

BACKGROUND OF THE INVENTION

This invention relates in general to brake drums or rotors and in particular to a brakedrum or rotor having improved fatigue resistance and friction pad burnishing characteristics.

Frictional forces are used to slow and stop wheeled vehicles that are in motion. Typically, non-rotating brake pads which are affixed to brake shoes or brake calipers are pressed against a surface which is attached to the wheel and rotating therewith. The rotating surface is formed on the inside of a brake drum or upon a brake rotor. As the brake pad slides over the surface, the wheel is slowed and the vehicle's kinetic energy is converted to heat. The heat is dissipated through the drum or rotor material. Finally, the brake pad clamps the surface, holding the attached wheel stationary.

Brake drums and rotors are often cast from iron, which has excellent heat conducting properties. The castings are machined to provide a true circular surface to be engaged by the brake pads. By truing the surface, vibration is minimized. Holes are also drilled in the casting which receive wheel mounting studs. In a typical application, vehicle wheels are bolted to the studs mounted in the brake drum. The brake drums are mounted upon an axle hub and rotate with the axle. Brake shoes having arcuate brake pads are mounted upon a backing plate. The backing plate is rigidly bolted to the vehicle housing axle and is thus held stationary. Disc bake rotors also have studs for attaching vehicle wheels and are mounted upon an axle hub the same as brake drums. However, the brake pads are held in position over machined rotor surfaces by calipers which are rigidly mounted upon the vehicle. Pressurized hydraulic or pneumatic actuators are used to urge the brake pads against the machined surface of the drum or rotor to brake the vehicle.

Repeated brake applications cause cycles of heating and cooling of the brake drum which expand and contract the drum metal. The expansion and contraction of the metal causes increases in residual tensile stresses which were previously induced by the machining operations carried out upon the brake drum. As the tensile stresses increase, cracks may form in the drum surface. This formation of cracks in the brake drum surface is commonly referred to as heat checking.

While the brake pads are formed to the approximate curvature of the inside machined surface of the brake drum, the mating surfaces between new brake pads and new brake drums generally to do not match one another. However, the pads are burnished during initial usage on the vehicle to exactly match the brake drum surface. During this initial burnishing, high spots on the the brake pad can cause localized areas of high temperature on the inside machined surface of the brake drum. These high surface temperatures can change the crystalline structure of the drum metal as the cast iron is changed to martensite. This is known as hot spotting and can cause surface cracking.

Disc brake rotors are subject to the same heating and cooling effects of repeated braking cycles.

In the past, it has been known that residual tensile stresses induced in a metal part during machining operations can be counteracted by subjecting the part to a prestressing process to induce compressive stresses in the surface of the part. If the induced compressive stress exceeds the tensile stress, a residual compressive stress is then established in the surface of the part. The residual compressive stress acts to offset service-imposed tensile stress, such as that caused by heat checking, and significantly increases the fatigue life of the part. Processes which have heretofore been used to induce compressive stresses include surface hardening, honing, polishing, burnishing, rolling and shot peening. Shot peening, in particular, has been found effective in treating many vehicle parts such as connecting rods, crankshafts, gears, shafts, axles, coil and leaf springs.

SUMMARY OF THE INVENTION

This invention relates to an improved brake drum or rotor having a prestressed and roughened brake pad contact surface to increase its fatigue resistance and its ability to quickly burnish an associated friction pad. The machined surface of a brake drum is prestressed by a metal treating process, such as shot peening, to induce compressive stresses in the machined surface. These compressive stresses combine with and reduce residual surface tensile stresses caused by machining operations used to fabricate the brake drum. If enough compressive stress is induced, the residual surface tensile stresses are totally cancelled. The result is that heat checking is reduced, and the fatigue resistance of the drum is increased.

Furthermore, when shot peening is used, the process roughens the machined surface as impacts of the peening balls dent the surface. The roughened surface abrades the high points on the brake pads and thereby reduces burnishing time for the contacting pad surfaces. By decreasing the time needed to burnish the pads, surface cracking due to hot spotting is minimized, which also extends brake drum life.

In addition, by randomly roughening the surface, the spiral cutting tool marks are removed, thus eliminating "cork screwing" of the linings (i.e., the tendency for the shoes to be urged in either an outboard or inboard direction when the brakes are applied). This significantly reduces or eliminates "shoe slap" which would otherwise occur as a result of the spiral tool marks.

Similar results are achieved by prestressing disc rotor surfaces that are contacted by brake pads.

Other advantages of the present invention will become apparent to those skilled in the art from the following detailed description of the preferred embodiment, when read in light of the accompanying drawings.

BRIEF DESCRIPTION OF THE DRAWINGS

FIG. 1 is a block diagram illustrating the steps for forming a brake drum according to the present invention.

FIG. 2 is a sectional perspective view of a brake drum of the present invention, produced according to the process of FIG. 1.

DETAILED DESCRIPTION OF THE PREFERRED EMBODIMENT

Figure 3:
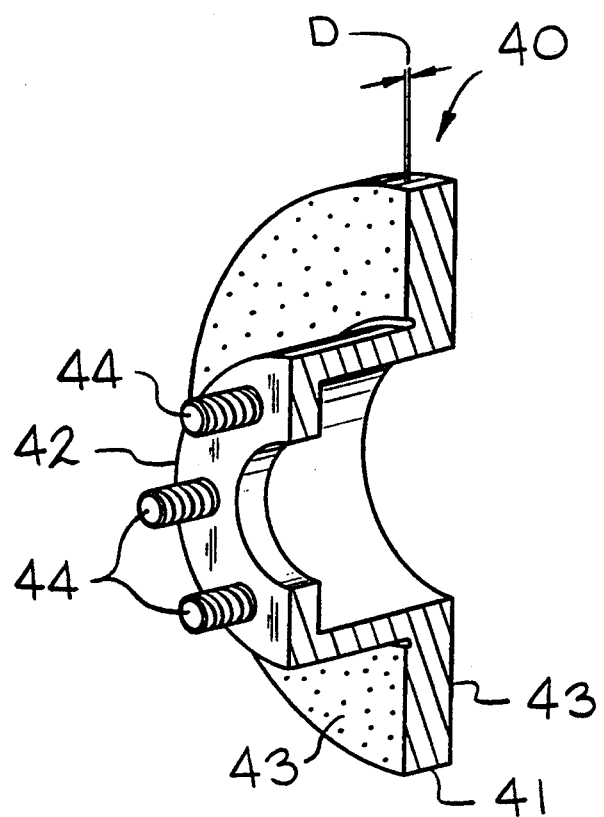
FIG. 3 is a sectional perspective view of a disc brake rotor according to the present invention.

Referring now to the drawings, there are illustrated in FIG. 1 the steps used to form a brake drum according to this invention. The drum is cast in the first step 10 using conventional casting techniques, such as sand casting. Frequently gray iron, which has excellent heat transfer characteristics, is used as the casting metal; however, other metals may also be used. The casting is then machined in the next step 11. The typical machined surfaces are illustrated in the sectional/perspective view of a brake drum 20 shown in FIG. 2. A cylindrical surface 21 is machined on the inside of the drum 20 to minimize vibration when the brake pads (not shown) are pressed against the surface 21. The inside surface of an annular flange 22 that covers the rear of the drum 20 is also machined to assure clearance between the brake drum and the other brake components. An inner lip 23 is often formed as machining removes metal from the inside surface 22 of the flange. An outer lip 24 is machined to assure clearance from the backing plate (not shown). A chamfer 25 is machined between the outer lip 24 and the inner surface 21 to provide a transition and eliminate a sharp edge. A wrap around 26 between the inner surface 21 and the flange 22 is not generally machined. Also, the drum outer surface 27 is not machined. The drum may have an outer circumferential ring 28 to add stiffness. The ring 28 is commonly referred to as a squealer band. Following machining, a plurality of holes 29 are drilled through the flange 22 as the next step 12 of fabrication. These holes can be threaded to receive wheel mounting studs (not shown).

To this point, the fabrication of the brake drum 20 has followed conventional steps. The machining operations induce tensile stresses in the drum surfaces as the machine tooling tears away a portion of the surface. The residual tensile stresses cause heat checking when small cracks develop and then grow in the surface as the drum is heated and cooled during normal braking cycles. The cracks can ultimately lead to metal fatigue and potential brake drum failure.

The present invention involves prestressing the machined surfaces of a brake drum (or rotor) to induce compressive stresses therein. The invention is shown as an additional step 13 in FIG. 1. The effect of the prestressing is an extension of the fatigue life of the brake drums so treated. The heating and cooling of the prestressed drums during brake applications continue to expand and contract the metal, eventually causing tensile stresses to reappear, but only after the compressive stress are relieved. Thus, while cracks may eventually develop in the surfaces, their emergence is significantly delayed over prior art brake drums.

Several processes are available to prestress brake drums. A number of processes involve applying direct pressure to the machined surface. These processes include shot peening, roll burnishing, knurling and compression over a mandrel. Processes that do not involve direct application of pressure include heat treating and magnaforming. With heat treating, nonuniform cooling of a heated casting retains compressive stresses in the casting; with magnaforming, large magnets induce compressive stresses within the component. The particular process selected would be determined with an individual case by case evaluation of the the economics involved. All of the processes can produce a uniform distribution of compressive stress across the surface. This is in contrast to the nonuniform distribution of surface stresses in a non-prestressed part.

In many applications, shot peening has been found to be a relatively low cost process for inducing the desired surface compression stresses in a previously machined metal part. Shot peening involves directing a high velocity stream of shot against a surface being treated. Upon contact with the surface, the shot produces slight, rounded depressions in the surface, which are shown as dotted areas in FIGS. 2 and 3. The shot stretches the surface radially and causes plastic flow of the metal at the instant of impact. The effect usually extends from 0.005 to 0.030 inches deep (represented in FIGS. 2 and 3 as dimension D), depending upon the hardness of the part, shot size and peening intensity. The metal beneath this layer is not plastically deformed. In the stress distribution that results from shot peening, the surface metal has induced compressive stress parallel to the surface. The metal below the surface layer does have reaction-induced tensile stress. However, the surface compressive stresses may be several times greater than the subsurface tensile stresses, which provides the improved fatigue life for the part.

The rounded depressions caused by the shot peening imparts a slight roughening to the machined surface. As a result, the mating brake pads are more quickly burnished to the shape of the inner surface 21 of the drum 20. Reduction of the brake pad burnishing time has been found to reduce the amount of hot spotting caused by high spots on the brake pads rubbing against the machined surface 21 and the related formation of drum surface cracks.

Thus, shot peening is a particularly effective process for prestressing a brake drum. Generally, prior to shot peening, the machined surface will have a surface "roughness" which is usually less than 200 microinches. It has been found that shot peening to obtain a surface roughness or texture greater than 200 microinches, and preferably in the range of 200 to 500 microinches, produces the desired surface roughness and depth of compressive stress. More particularly, a surface roughness in the range of 240–300 microinches is preferable.

U.S. Military Specification MIL-S-13165C can be used to control the shot peening process. Preferably, metallic peening shot having a diameter of approximately 0.055 inches is used. Such shot is directed at the surface at a velocity which imparts a curvature of four to six thousandths of an inch, as measured on an Almen Gauge, to an Almen Test Strip. With this specific process, the maximum compressive stress induced occurs between 0.003 and 0.006 inches below the surface and is within the range of 17,500 to 25,000 pounds per square inch.

Generally, the prestressing is applied to all machined surfaces of the brake drum. Thus the inner surface 21, the outer lip 24, the chamfer 25 and the inside surface of the flange 22 are shot peened. In the process, the wrap around 26 would also be treated, even though it is not machined. This is an expediency since it would be more expensive to mask this area than to shot peen it. Similarly, in a heat treating process, all surfaces, including non-machined ones would be treated due to the nature of the process.

The fatigue life of brake disc rotors is also increased by prestressing the machined surfaces. A typical brake rotor 40 is shown in FIG. 3. The rotor consists of an annular flange 41 having a cylindrical center portion 42. Parallel surfaces 43 are machined upon the flange portion 41 for engagement by brake pads (not shown) mounted upon calipers (not shown). Studs 44 are used for mounting a wheel (not shown) upon the rotor. Tensile stresses are induced in the machined surfaces 43 by one of the processes listed above. As in brake drums, prestressing of the machined surfaces 43 will relieve the surface tensile stresses and induce residual surface compressive stresses. The compressive stresses act to extend the lifetime of the brake rotor. If shot peening is used as the treatment process, the roughened machined surfaces enhance burnishing of the brake pads as described above.

While shot peening both induces surface compressive stress and roughens the surface, in some situations, prestressing of the brake drum or rotor may not be desired. For example, if only minor tensile stress have been induced in the surface, the additional step of prestressing the surface may be deemed inappropriate. In these situations, however, a roughened surface would still be needed for burnishing the brake pads. When only a roughened surfaced is needed, processes other than shot peening may be used to obtain it. For example, knurling can be used to provide the slight roughening desired.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A method for forming an improved vehicle brake component adapted to engage a brake pad comprising:
   (a) providing an annular rotatable brake component selected from the group consisting of a vehicle brake drum and a vehicle brake rotor, the brake component having a machined annular surface for frictional engagement with the brake pad, the machined surface having residual stresses formed therein as a result of a machining operation which provides the brake component with an initial fatigue life; and
   shot peening the machined surface to prestress the machined surface by inducing compressive stresses to reduce the residual surface tensile stresses produced by the machining operation and to increase the fatigue life of the brake component.

2. The method defined in claim 1 and further including shot peening the machined surface to provide the machined surface with a roughness sufficient to effectively burnish the brake pad upon initial brake applications.

3. The method defined in claim 2 wherein the machined surface is roughened to a roughness in the range of 200–500 microinches.

4. The method defined in claim 1 wherein the brake drum component is a brake drum.

5. The method defined in claim 4 wherein said brake drum includes an outer lip having a chamfered edge, and wherein said outer lip is shot peened to prestress said outer lip by inducing compressive stresses therein.

6. The method defined in claim 4 wherein said brake drum includes an annular flange having an inner surface, and wherein said inner surface is shot peened to prestress said inner surface by inducing compressive stresses therein.

7. The method defined in claim 1 wherein the brake component is a disc brake rotor.

* * * * *